United States Patent
Matsui

(10) Patent No.: US 12,463,539 B2
(45) Date of Patent: Nov. 4, 2025

(54) CONTROL DEVICE OF MULTI-PHASE DC/DC CONVERTER AND MULTI-PHASE DC/DC CONVERTER

(71) Applicant: ROHM CO., LTD., Kyoto (JP)

(72) Inventor: Takuro Matsui, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 287 days.

(21) Appl. No.: 18/305,710

(22) Filed: Apr. 24, 2023

(65) Prior Publication Data
US 2023/0353033 A1    Nov. 2, 2023

(30) Foreign Application Priority Data
May 2, 2022   (JP) ................................ 2022-075807

(51) Int. Cl.
*H02M 3/158*   (2006.01)
*H02M 1/00*    (2006.01)

(52) U.S. Cl.
CPC ....... *H02M 3/1586* (2021.05); *H02M 1/0025* (2021.05); *H02M 3/1584* (2013.01)

(58) Field of Classification Search
CPC . H02M 3/1584; H02M 3/1586; H02M 1/0025
See application file for complete search history.

(56) References Cited

U.S. PATENT DOCUMENTS

| | | | | |
|---|---|---|---|---|
| 6,670,794 B1* | 12/2003 | Wang | ............... | H02M 3/1584 323/213 |
| 2010/0315847 A1* | 12/2010 | Maher | ............... | H02M 3/1584 363/50 |
| 2017/0214318 A1* | 7/2017 | Takenaka | ............ | H02M 3/1584 |

FOREIGN PATENT DOCUMENTS

JP    2017085858    5/2017

* cited by examiner

*Primary Examiner* — Alex Torres-Rivera
(74) *Attorney, Agent, or Firm* — Fish & Richardson P.C.

(57) ABSTRACT

The present disclosure provides a control device of a multi-phase DC/DC converter. The control device generates an error signal between a feedback voltage and a reference voltage according to an output voltage. For each channel, a detected current value of a target current is derived by A/D converting the target current flowing through a switching transistor during an ON period of the switching transistor. A PWM signal is generated based on the error signal and a current corresponding signal corresponding to the target current to drive the switching transistor. An average value of multiple detected current values corresponding to multiple channels is derived. The channel corresponding to the detected current value with largest difference from the average value is specified as a target channel. The value of the target current in the target channel approaches the average value. The PWM signal corresponding to the target channel can be generated.

16 Claims, 9 Drawing Sheets

| 1st cycle | |
|---|---|
| $I_{CS}[1]$ | 99 |
| $I_{CS}[2]$ | 111 |
| $I_{CS}[3]$ | 92 |
| $I_{CS}[4]$ | 98 |
| $I_{AVE}$ | 100 |

↑ Lower offset

| 2nd cycle | |
|---|---|
| $I_{CS}[1]$ | 100 |
| $I_{CS}[2]$ | 108 |
| $I_{CS}[3]$ | 93 |
| $I_{CS}[4]$ | 99 |
| $I_{AVE}$ | 100 |

↑ Lower offset

| 3rd cycle | |
|---|---|
| $I_{CS}[1]$ | 101 |
| $I_{CS}[2]$ | 105 |
| $I_{CS}[3]$ | 94 |
| $I_{CS}[4]$ | 100 |
| $I_{AVE}$ | 100 |

↑ Raise offset

| 4th cycle | |
|---|---|
| $I_{CS}[1]$ | 100 |
| $I_{CS}[2]$ | 104 |
| $I_{CS}[3]$ | 97 |
| $I_{CS}[4]$ | 99 |
| $I_{AVE}$ | 100 |

↑ Lower offset

| 5th cycle | |
|---|---|
| $I_{CS}[1]$ | 101 |
| $I_{CS}[2]$ | 101 |
| $I_{CS}[3]$ | 98 |
| $I_{CS}[4]$ | 100 |
| $I_{AVE}$ | 100 |

FIG. 10

CONTROL DEVICE OF MULTI-PHASE DC/DC CONVERTER AND MULTI-PHASE DC/DC CONVERTER

TECHNICAL FIELD

The disclosure relates to a control device of a multi-phase direct current-direct current (DC/DC) converter and a multi-phase DC/DC converter.

BACKGROUND

In a multi-phase direct current-direct current (DC/DC) converter, a output-stage circuit including multiple channels each having a switching transistor, a coil and a rectifying element is provided. A phase difference is configured at the switch of the multiple output-stage circuits, and the switch is driven to obtain one stable output voltage.

PRIOR ART DOCUMENT

Patent Publication

Patent document 1: Japan Patent Publication No. 2017-85858

SUMMARY OF THE PRESENT DISCLOSURE

Problems to be Solved by the Disclosure

In a multi-phase DC/DC converter, it is ideal to equalize currents of an output-stage circuit flowing among channels. However, due to the deviation of inductances value among multiple coils, the balance of the current may collapse, and there is a concern that the current is concentrated in the coil of a specific channel.

It is an object of the disclosure to provide a control device of a multi-phase direct current-direct current (DC/DC) converter and a multi-phase DC/DC converter beneficial for achieving good current balance.

Technical Means for Solving the Problem

A control device of the disclosure is a control device of a multi-phase DC/DC converter, the control device generating an output voltage from an input voltage by using an output-stage circuit including a plurality of channels, each of the plurality of channels having a switching transistor, a coil and a rectifying element. The control device includes: an error signal generation circuit, configured to generate an error signal between a feedback voltage and a reference voltage according to the output voltage; a current detection circuit, configured to, for each of the plurality of channels, analog-to-digital (A/D) convert a target current flowing through the switching transistor during an ON period of the switching transistor to derive a detected current value of the target current; a pulse-width modulation (PWM) modulation circuit, configured to, for each of the plurality of channels, generate a PWM signal based on the error signal and a current corresponding signal according to the target current; and a plurality of drive circuits, corresponding to the plurality of channels, each drive circuit driving a corresponding switching transistor based on a corresponding PWM signal. Wherein, the PWM modulation circuit derives an average value of a plurality of detected current values corresponding to the plurality of channels, specifies a channel corresponding to the detected current value having a greatest difference from the average value as a target channel, and generates the PWM signal corresponding to the target channel such that the current value of the target current in the target channel approaches the average value.

Effects of the Disclosure

According to the disclosure, a control device of a multi-phase DC/DC converter and a multi-phase DC/DC converter beneficial for achieving good current balance can be provided.

BRIEF DESCRIPTION OF THE DRAWINGS

FIG. 10 is a diagram of a situation where currents of individual channels approximate an average current according to the first embodiment of the embodiments of the disclosure.

DETAILED DESCRIPTION

Figure 1:
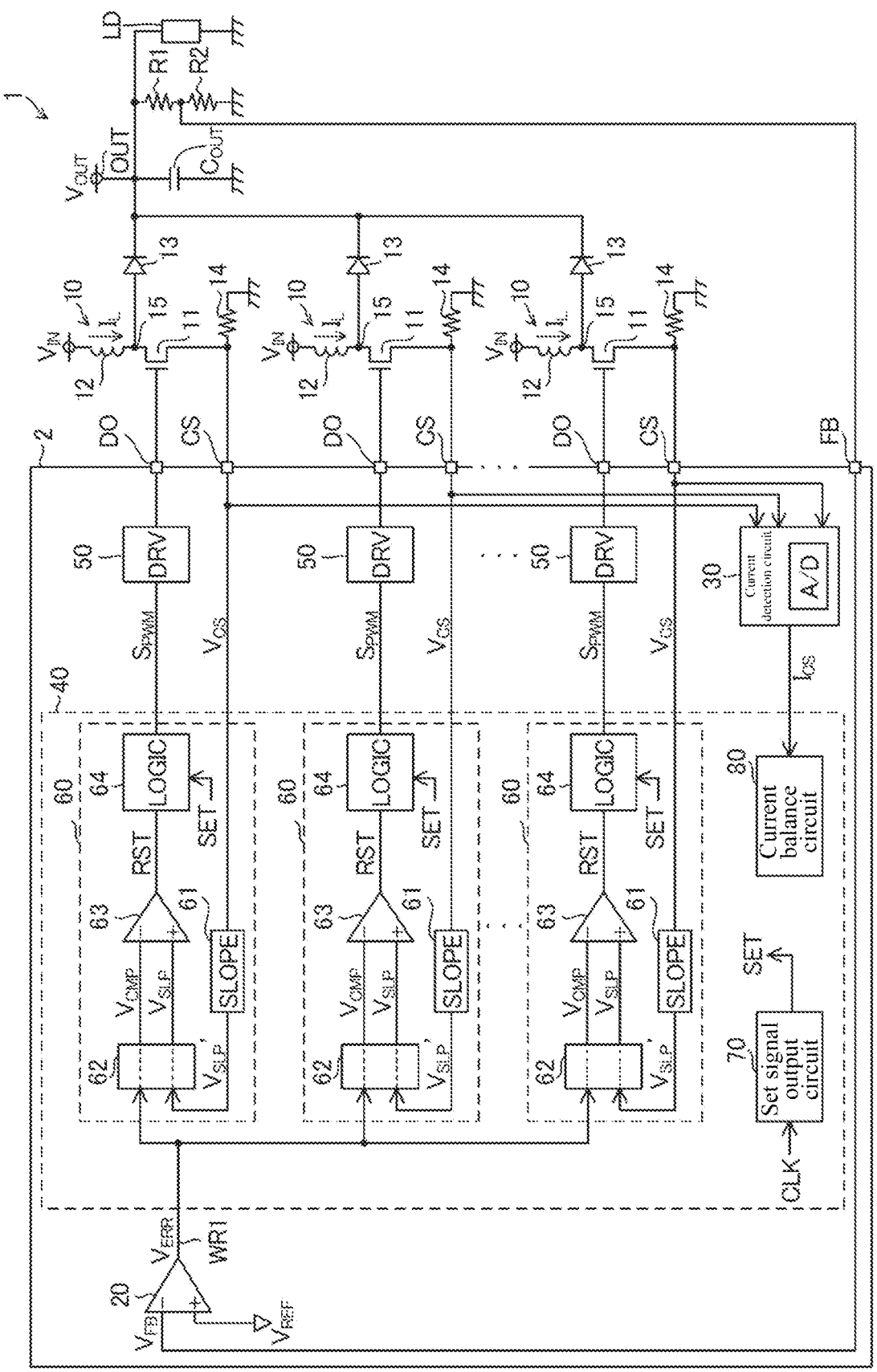
FIG. 1 is an overall structural diagram of a direct current-direct current (DC/DC) converter according to an embodiment of the disclosure.

Details of examples of the embodiments of the present disclosure are given with the accompanying drawings below. In the reference drawings, the same parts are denoted by the same numerals or symbols, and repeated description related to the same parts is in principle omitted. Moreover, in the description, for the sake of brevity, the names of information, signals physical quantities, functional units, circuits, elements or parts corresponding to numerals or symbols are sometimes abbreviated or omitted with reference to the numerals or symbols of the information, signals, physical quantities, functional units, circuits, elements or parts.

Some terms and definitions of configurations used in the description of the embodiments of the disclosure are first explained below. The so-called "ground" refers to a reference conductive unit having a reference voltage of 0 V potential or the 0 V potential itself. The reference conductive unit may be a conductor formed of such as metal. The 0 V potential is sometimes referred to as a ground potential. In the embodiments of the disclosure, a voltage expressed without a specifically set reference represents a potential from a ground aspect.

For any concerned signal or voltage, the level refers to the level of a potential, and a high level has a potential higher than that of a low potential. For any concerned signal or voltage, the signal or voltage at a high level means that the level of the signal or voltage is at a high level, and the signal or voltage at a low level means that the level of the signal or voltage is at a low level. The level of a signal is sometimes expressed as a signal level, and the level of a voltage is sometimes expressed as a voltage level. For any signal of which the signal level is a high level or a low level, a period in which the level of the signal becomes a high level is referred to as a high-level period, and a period in which the level of the signal becomes a low level is referred to as a low-level period. The same applies to any voltage of which the voltage level is a high level or a low level.

For any concerned signal or voltage, switching from a low level to a high level is referred to as a rising edge, and a time of switching from a low level to a high level is referred to as a rising edge time. The rising edge may be referred to as a positive edge. Similarly, for any concerned signal or voltage, switching from a high level to a low level is referred to as a falling edge, and a time of switching from a high level to a low level is referred to as a falling edge time. The falling edge may be referred to as a negative edge.

For any transistor formed as a field-effect transistor (FET) including a metal-oxide-semiconductor field-effect transistor (MOSFET), an ON state refers to a state of conduction between the drain and the source of the transistor, and an OFF state refers to a state of non-conduction (a state of disconnection) between the drain and the source of the transistor. The same applies to those categorized as non-FET transistors. Unless otherwise specified, a MOSFET may be interpreted as an enhanced MOSFET. MOSFET is an abbreviation of metal-oxide-semiconductor field-effect transistor. Moreover, unless otherwise specified, in any MOSFET, it is considered that the back gate is shorted with the source.

In the description below, for any transistor, the ON state and the OFF state may also be expressed simply as ON and OFF. For any transistor, switching from a state of disconnection to a state of conduction is expressed as turning on, and switching from a state of conduction to a state of disconnection is expressed as turning off. Moreover, for any transistor, a period in which the transistor becomes in an ON state is referred to an ON period, and a period in which the transistor becomes in an OFF state is referred to as an OFF period.

A connection formed between multiple parts of a circuit, such as elements, wires and nodes that form a circuit, refers to an electrical connection unless otherwise specified.

The embodiments of the disclosure are described below. FIG. 1 shows an overall structural diagram of a direct current-direct current (DC/DC) converter 1 according to an embodiment of the disclosure. The DC/DC converter 1 is a multi-phase DC/DC converter that generates an output voltage $V_{OUT}$ from an input voltage $V_{IN}$ by using output-stage circuits 10 of a plurality of channels. Herein, "n" is used to represent the number of channels, and n is any integer equal to or greater than 3 (or "n=2"). Thus, the output-stage circuits 10 of the $1^{st}$ to $n^{th}$ channels are provided in the DC/DC converter 1. The denotation "10[$i$]" is used to refer to the output-stage 10 (referring to FIG. 2) in the $i^{th}$ channel, where i is any desired natural number less than n.

Figure 2:
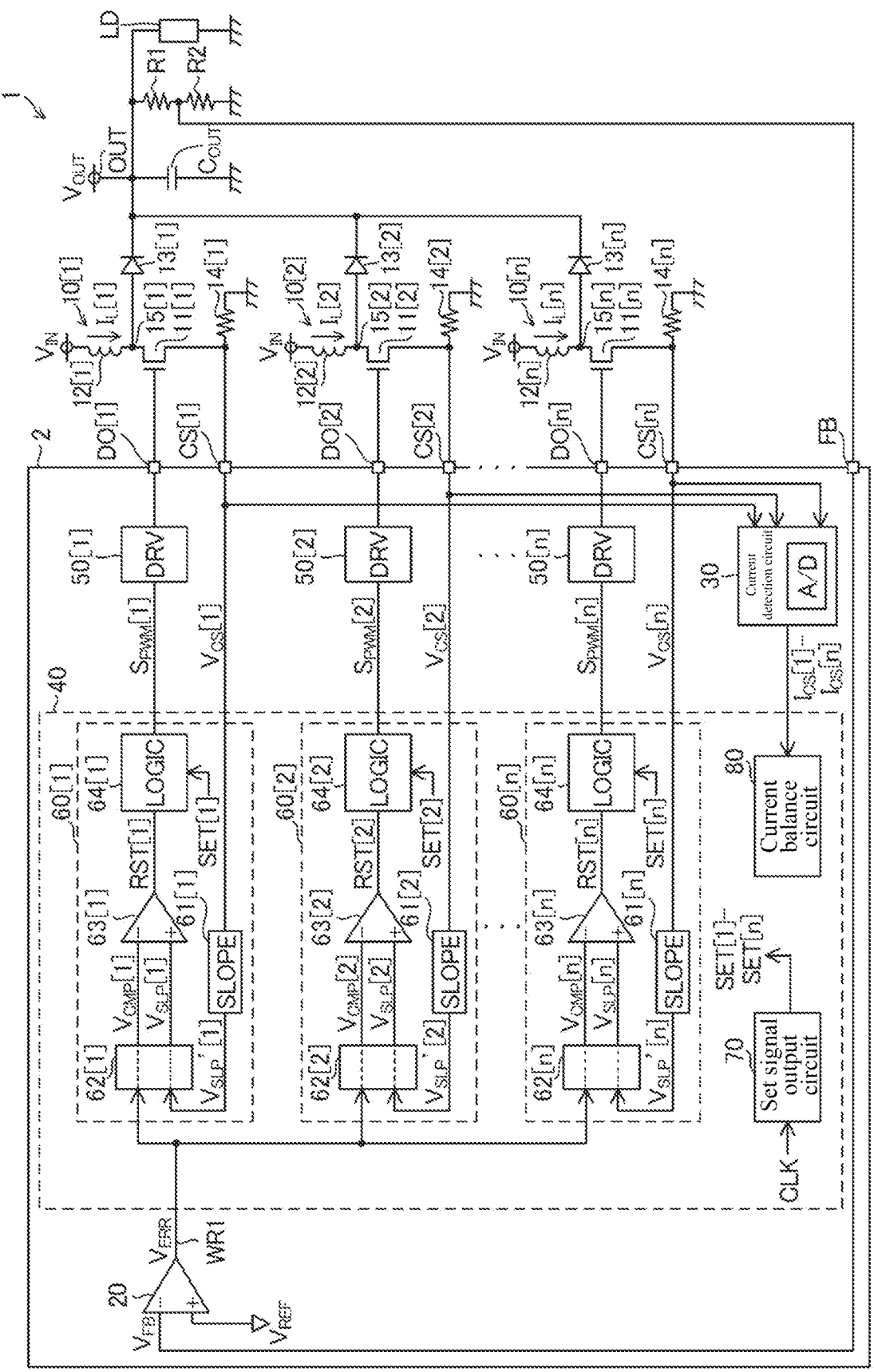
FIG. 2 is an overall structural diagram of a DC/DC converter according to an embodiment of the disclosure.

The output-stage circuits 10 of the $1^{st}$ to $n^{th}$ channels have identical structures from one another. Each output-stage 10 includes a switching transistors 11, a coil 12 and a rectifying element 13. The switching transistor 11 is an N-channel MOSFET. In each output-stage circuit 10, a sense resistor 14 is provided as a resistor used to detect the current flowing through the switching transistor 11. Referring to FIG. 2, more particularly, the denotations "11[$i$]", "12[$i$]", "13[$i$]" and "14[$i$]" are used to refer to the switching transistor 11, the coil 12, the rectifying element 13 and the sense resistor 14 in the output-stage circuit 10[$i$].

Herein, for example, the DC/DC converter 1 is implemented by a step-up DC/DC converter using diode rectification. When the diode rectification is used, the rectifying element 13 is a rectifier diode 13. Specifically, in the output-stage circuit 10[$i$] of any channel, a first end of the coil 12[$i$] is connected to a terminal to which the input voltage $V_{IN}$ is applied, and a second end of the coil 12[$i$] is connected via a node 15[$i$] to the drain of the switching transistor 11[$i$] and the anode of the rectifier diode 13[$i$]. In the output-stage circuit 10[$i$], the source of the switching transistor 11[$i$] is connected to a first end of the sense resistor 14[$i$], and the second end of the sense resistor 14[$i$] is grounded.

The respective cathodes of the rectifier diodes 13[1] to [13[$n$]] are commonly connected to an output terminal OUT. The output voltage $V_{OUT}$ is applied to the output terminal OUT. The input voltage $V_{IN}$ and the output voltage $V_{OUT}$ are positive DC currents different from each other. The DC/DC converter 1 in FIG. 1 is a step-up DC/DC converter, and so "$V_{IN} < V_{OUT}$" holds true. Moreover, in each channel, the current flowing through the coil 12 is referred to as a coil current $I_L$. More particularly, the denotation "$I_L[i]$ is used to refer to the current flowing through the coil 12[$i$] (referring to FIG. 2). The coil current $I_L[i]$ flows from the terminal to which the input voltage $V_{IN}$ is applied to the node 15[$i$]. In each channel, during an ON period of the switching transistor 11[$i$], the coil current $I_L[i]$ passes through the switching transistor 11[$i$] and the sense resistor 14[$i$] and flows to the ground. In each channel, during an OFF period of the switching transistor 11[$i$], the coil current $I_L[i]$ passes through the rectifier diode 13[$i$] and flows to the output terminal OUT. A load LD is connected to the output terminal OUT. The load LD is any load driven based on the output voltage $V_{OUT}$. A consumption current of the load LD (that is, the current flowing from the output terminal OUT through the load LD to the ground) is referred to as a load current.

An output capacitor $C_{OUT}$ and voltage divider resistors R1 and R2 are provided in the DC/DC converter 1. The first end of the output capacitor $C_{OUT}$ is connected to the output terminal OUT, and the second end of the output capacitor $C_{OUT}$ is grounded. The first end of the voltage divider resistor R1 is connected to the output terminal OUT, and the second end of the voltage divider resistor R1 is grounded via the voltage divider resistor R2. Thus, a feedback voltage $V_{FB}$ corresponding to the output voltage $V_{OUT}$ is generated at a connection node between the voltage divider resistors R1 and R2.

In the DC/DC converter 1, a control device 2 that controls the operation of the DC/DC converter 1 by means of driving the switching transistor 11 of each channel is provided. In the control device 2, an error amplifier 20, a current detection circuit 30, a pulse-width modulation (PWM) modulation circuit 40, and drive circuits 50 for n channels are provided. Referring to FIG. 2, more particularly, the denotation "50[i]" is used to refer to the drive circuit 50 in the $i^{th}$ channel.

Moreover, drive terminals DO for n channels, current detection terminals CS for n channels and a feedback terminal FB are provided at the control terminal 2. The feedback terminal FB is connected to a connection node between the voltage divider resistors R1 and R2, and receives the feedback voltage $V_{FB}$. Referring to FIG. 2, more particularly, the denotation "DO[i]" is used to refer to the drive terminal DO in the $i^{th}$ channel, and more particularly, the denotation "CS[i]" is used to refer to the current detection terminal CS in the $i^{th}$ channel. The drive terminal DO[i] is connected to the gate of the switching transistor 11[i] outside the control device 2. The current detection terminal CS[i] is connected to the source of the switching transistor 11[i] outside the control device 2. Thus, in each channel, a signal $V_{CS}$ having a potential equal to the amount of voltage drop of the sense resistor 14 is applied to the current detection terminal CS. The signal $V_{CS}$ is a voltage signal proportional to the current flowing through the switching transistor 11, and is referred to as a current corresponding signal $V_{CS}$ below. Moreover, more particularly, the denotation "$V_{CS}$[i]" is used to refer to the current corresponding signal $V_{CS}$ in the $i^{th}$ channel (that is, the current corresponding signal $V_{CS}$ applied to the current detection terminal CS[i]) (referring to FIG. 2).

The error amplifier 20 is an example of an error signal generation circuit. The error amplifier 20 includes an inverting input terminal, a non-inverting input terminal and an output terminal. In the error amplifier 20, the inverting input terminal is connected to the feedback terminal FB, and receives the feedback voltage $V_{FB}$. The reference voltage $V_{REF}$ is applied to the non-inverting input terminal of the error amplifier 20. The reference voltage $V_{REF}$ has a specific positive DC voltage value. The error amplifier 20 outputs from its output terminal an error signal $V_{ERR}$ corresponding to a comparison result of the feedback voltage $V_{FB}$ and the reference voltage $V_{REF}$. The error signal $V_{REF}$ is a voltage signal. The output terminal of the error amplifier 20 is connected to a wire WR1, and generates the error signal $V_{ERR}$ in the wire WR1. When "$V_{FB} < V_{REF}$" holds true, the error amplifier 20 supplies charge (positive charge) to the wire WR1, and accordingly the potential of the error signal $V_{ERR}$ rises. When "$V_{FB} > V_{REF}$" holds true, charge (positive charge) is drawn from the wire WR1 by the error amplifier 20, and accordingly the potential of the error signal $V_{ERR}$ lowers. Although not specifically depicted, for example, a phase compensation circuit including a serial circuit of a resistor and a capacitor may be provided between the wire WR1 and the ground.

For each channel, the current detection circuit 30 detects the current (to be referred to as a target current) flowing through the switching transistor 11 during the ON period of the switching transistor 11. In each channel, during the ON period of the switching transistor 11, the coil current $I_L$ flows through the switching transistor 11. Thus, in each channel, the target current may be considered to be equivalent to the coil current $I_L$.

More specifically, the current detection circuit 30 is connected to the current detection terminals CS[1] to CS[n], and receives the current corresponding signals $V_{CS}$[1] to $V_{CS}$[n]. In each channel, the current corresponding signal $V_{CS}$ is an analog voltage signal proportional to the target current. The current detection signal 30 includes an analog-to-digital converter (ADC) (not shown) for A/D conversion, samples the current corresponding signal $V_{CS}$ at a target time in the ON period of the switching transistor 11 for each channel, and converts the current corresponding signal $V_{CS}$ at the target time to a digital signal by means of A/D conversion. Accordingly, the current detection circuit 30 acquires the digital signal having a detected current value $I_{CS}$ for each channel. More particularly, the denotation "$I_{CS}$[i] is used to refer to the detected current value $I_{CS}$ in the $i^{th}$ channel (referring to FIG. 2). The detected current value $I_{CS}$[i] is a digital value proportional to the voltage value of the current corresponding signal $V_{CS}$[i] at the target time during the ON period of the switching transistor 11[i], and hence represents the value of the target current (hence the value of the coil current $I_L$[i]) of the $i^{th}$ channel at the target time). The detected current values $I_{CS}$[1] to $I_{CS}$[n] are acquired by means of A/D conversion for each channel.

The PWM modulation circuit 40 generates a signal $S_{PWM}$ based on the error signal $V_{ERR}$ and the current corresponding signal $V_{CS}$ for each channel. The signal $S_{PWM}$ is a signal having undergone pulse-width modulation (that is, a PWM signal). The signal $S_{PWM}$ is a binary signal having a signal level at a high level or a low level. The PWM modulation circuit 40 outputs the generated signal $S_{PWM}$ to the corresponding drive circuit 50 for each channel. More particularly, the denotation "$S_{PWM}$ [i] is used to refer to the signal $S_{PWM}$ in the $i^{th}$ channel (referring to FIG. 2).

The drives circuits 50 of the n channels drive the corresponding switching transistors 11 based on the corresponding signals $S_{PWM}$. Referring to FIG. 2, more particularly, the denotation "50[i]" is used to refer to the drive circuit 50 in the $i^{th}$ channel. In each channel, the drive circuit 50[i] receives the signal $S_{PWM}$ [i] from the PWM modulation circuit 40. In each channel, the drive circuit 50[i] is connected to the drive terminal DO[i]. The drive circuit 50[i] supplies, based on the signal $S_{PWM}$ [i], a gate signal at a high level or a low level to the gate of the switching transistor 11[i], and accordingly performs switch driving of the switching transistor 11[i].

The gate signal at a high level has a potential sufficiently higher than the gate threshold voltage of the switching transistor 11[i]. The gate signal at a low level has a potential sufficiently lower than the gate threshold voltage of the switching transistor 11[i]. In each channel, when the signal $S_{PWM}$ [i] is at a high level, the drive circuit 50[i] supplies a gate signal at a high level to the gate of the switching transistor 11[i], and accordingly sets the switching transistor 11[i] to be ON. In each channel, when the signal $S_{PWM}$ [i] is at a low level, the drive circuit 50[i] supplies a gate signal at a low level to the gate of the switching transistor 11[i], and accordingly sets the switching transistor 11[i] to be OFF.

The PWM modulation circuit 40 has modulation blocks 60 corresponding to the n channels, a set signal output circuit 70 and a current balance circuit 80. More particularly, the denotation "60[i]" is used to refer to the modulation block 60 in the $i^{th}$ channel (referring to FIG. 2). The signals $S_{PWM}$[1] to $S_{PWM}$ [n] are respectively generated at the modulation blocks 60[1] to 60[n].

The set signal output circuit 70 generates, based on a clock signal CLK having a predetermined PWM frequency, that is, a frequency $f_{PWM}$, signals SET (set signals) for the n channels. The signals SET for the n channels have a common frequency $f_{PWM}$. However, the signals SET for the n channels have phases shifted from one another (by 360°/n). More particularly, the denotation "SET[i] is used to refer to the signal SET in the $i^{th}$ channel (referring to FIG. 2).

Figure 3:
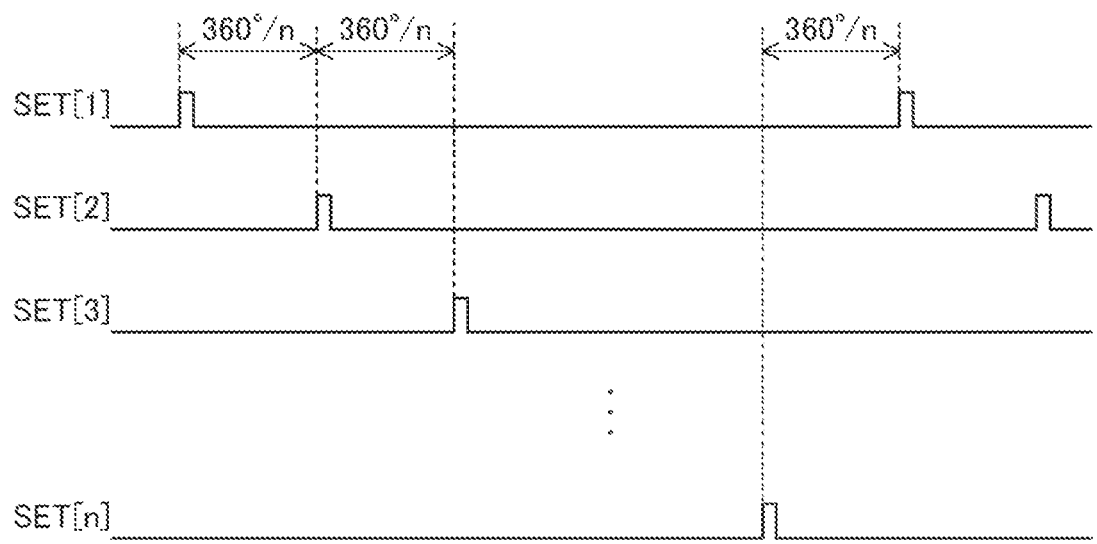
FIG. 3 is a waveform diagram of multiple signals (set signals) according to an embodiment of the disclosure.

FIG. 3 shows waveforms of the signals SET[1] to SET[n]. The signals SET[1] to SET[n] in principle have a low level. The reciprocal of the frequency $f_{PWM}$ is a PWM period. The set signal output circuit 70 generates a minute pulse according to the PWM period in each of the signals SET[1] to SET[n]. That is to say, the set signal output circuit 70 generates a rising edge according the PWM period in each of the signals SET[1] to SET[n]. However, from the perspective of the rising edge time of the signal SET[1], the rising edge time of the signal SET[j] is delayed by a time "$(1/f_{CLK}) \times (j-1)/n)$". Herein, "j" represents an integer equal to or greater than 2 and less than or equal to n. For example, if "n=8", from the perspective of the rising edge time of the signal SET[1], the rising edge time of the signal SET[2] is delayed by a time "$(1/f_{CLK}) \times 1/8$", and the rising edge time of the signal SET[3] is delayed by a delay time "$(1/f_{CLK}) \times 2/8$". When "n=8", the time "$(1/f_{CLK}) \times 1/8$" is equivalent to a 450 phase. In general, the signal SET[2] is a signal delayed by a phase (360°/n) from the perspective of the signal SET[1], the signal SET[3] is a signal delayed by a phase (360°/n) from the perspective of the signal SET[2], . . . , and the signal SET[n] is a signal delayed by a phase (360°/n) from the perspective of the signal SET[n-1].

The function of the current balance circuit 80 is to be described shortly. The internal structure of the modulation blocks 60 is first described below.

Each modulation block 60 includes a ramp voltage generation circuit 61, an offset superposition circuit 62, a comparator 63 and a logic circuit 64. The modulation blocks 60[1] to 60[n] have identical structures from one another. Referring to FIG. 2, more particularly, the denotations "61[i]", "62[i]", "63[i]" and "64[i]" are used to refer to the ramp voltage generation circuit 61, the offset superposition circuit 62, the comparator 63 and the logic circuit 64 in the modulation block 60[i], respectively.

In each channel, the ramp voltage generation circuit 61 generates a voltage signal corresponding to the current corresponding signal $V_{CS}$, that is, a ramp signal $V_{SLP}'$. The current corresponding signal $V_{CS}$ corresponding to the ramp voltage generation circuit 61[i] of the $i^{th}$ channel is the current corresponding signal $V_{CS}[i]$, and more particularly, the denotation "$V_{SLP}'[i]$" is used to refer to the ramp signal $V_{SLP}'$ generated by the ramp voltage generation circuit 61[i] (referring to FIG. 2).

Figure 4:
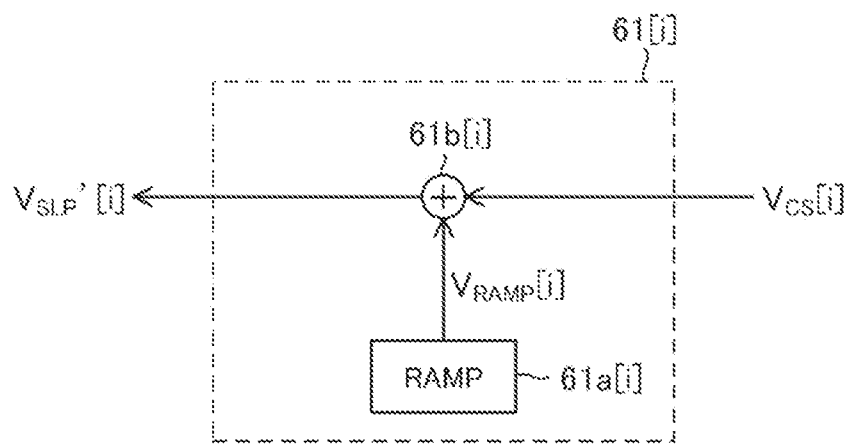
FIG. 4 is an internal structural diagram of a ramp voltage generation circuit according to an embodiment of the disclosure.

FIG. 4 shows an internal structure of the ramp voltage generation circuit 61. The ramp voltage generation circuit 61 includes a ramp voltage generation circuit 61a and an adder 61b. FIG. 4 depicts the ramp voltage generation circuit 61[i], and more particularly, the denotations "61a[i]" and "61b[i]" are used to refer to the ramp voltage generation circuit 61a and the adder 61b in the ramp voltage generation circuit 61[i], respectively. The ramp voltage generation circuit 61a generates a voltage signal, that is, a ramp signal $V_{RAMP}$. More particularly, the denotation "$V_{RAMP}[i]$" is used to refer to the ramp signal $V_{RAMP}$ generated by the ramp voltage generation circuit 61a[i].

Figure 5:
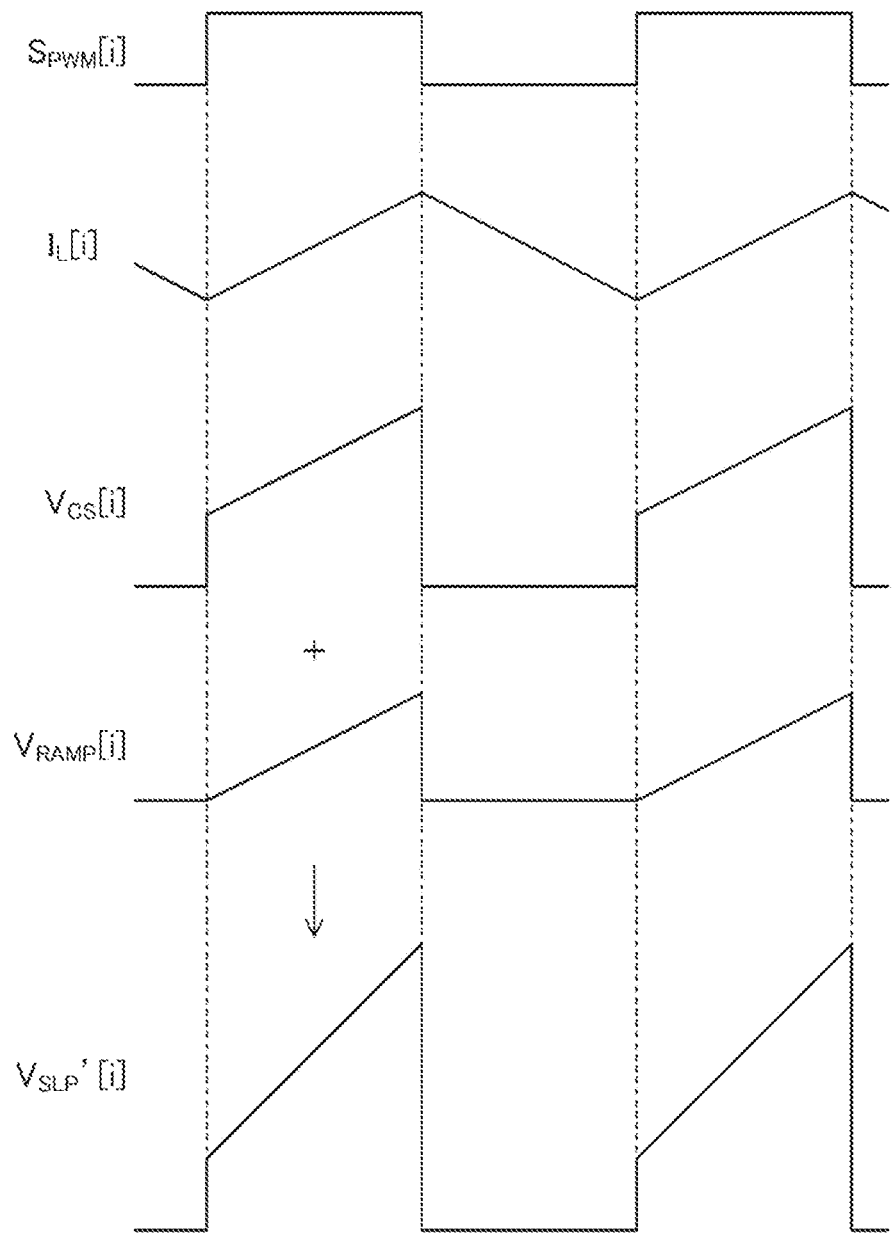
FIG. 5 is a waveform diagram of a several signals associated with the operation of a ramp voltage generation circuit according to an embodiment of the disclosure.

FIG. 5 shows a waveform diagram of a several signals associated with the operation of the ramp voltage generation circuit 61[i]. During the corresponding ON period of the switching transistor 11[i], the ramp voltage generation circuit 61a[i] generates a sawtooth voltage signal that gradually increases from an initial voltage value as a starting point, as the ramp signal $V_{RAMP}[i]$. The initial voltage value may be 0 V, or may have a bias value higher than 0 V. For example, from the rising edge time of the signal $S_{PWM}[i]$, the ramp voltage generation circuit 61a[i] causes the ramp signal $V_{RAMP}[i]$ to gradually increase from the initial voltage value as the starting point. The adder 61b[i] adds the ramp signal $V_{RAMP}[i]$ to the current corresponding signal $V_{CS}[i]$ to generate the ramp signal $V_{SLP}'[i]$. That is to say, the ramp signal $V_{SLP}'[i]$ is a signal summed from the current corresponding signal $V_{CS}[i]$ and the ramp signal $V_{RAMP}[i]$. It is generally known that, the oscillation in an output feedback loop under a current control mode can be inhibited by means of adding the ramp signal $V_{RAMP}$.

Again refer to FIG. 1. In each modulation block 60, the offset superposition circuit 62 supplies to the comparator 63 a signal $V_{CMP}$ based on the error signal $V_{ERR}$ and the signal $V_{SLP}$ based on the ramp signal $V_{SLP}'$. The signal $V_{CMP}$ and $V_{SLP}$ are voltage signal. In each modulation block 60, the offset superposition circuit 62 superimposes an offset signal on the error signal $V_{ERR}$ to generate the signal $V_{CMP}$, or superimposes the offset signal on the ramp signal $V_{SLP}'$ to generate the signal $V_{SLP}$. However, in the modulation blocks 60 of one or more channels, sometimes the offset signal is not superimposed. The superposition of the offset signal is to be described later.

In each modulation block 60, the signal $V_{CMP}$ serves as a first comparison input signal input to the inverting input terminal of the comparator 63, and the signal $V_{SLP}$ serves as a second comparison input signal input to the non-inverting input terminal of the comparator 63. In each modulation block 60, the comparator 63 compares the signals $V_{CMP}$ and $V_{SLP}$ input thereto, and generates and outputs a signal RST corresponding to the comparison result. In each modulation block 60, the logic circuit 64 generates and outputs the signal $S_{PWM}$ based on the output signal RST from the comparator 63 and the corresponding signal SET.

Referring to FIG. 2, more particularly, the denotations "$V_{CMP}[i]$", "$V_{SLP}[i]$" and "RST[i]" are used to refer to the signals $V_{CMP}$, $V_{SLP}$ and RST in the modulation block 60[i], respectively. The comparator 63[i] receives the signal $V_{CMP}[i]$ from the inverting input terminal, receives the signal $V_{SLP}[i]$ from the non-inverting input terminal, and outputs the signal RST[i]. In the comparator 63[i], if "$V_{SLP}[i] > V_{CMP}[i]$" (that is, if the potential of the signal $V_{SLP}[i]$ is higher than the potential of the signal $V_{CMP}[i]$), the signal RST[i] having a high level is output; if "$V_{SLP}[i] < V_{CMP}[i]$" (that is, if the potential of the signal $V_{SLP}[i]$ is lower than the potential of the signal $V_{CMP}[i]$), the signal RST[i] having a low level is output. When "$V_{SLP}[i] = V_{CMP}[i]$", the signal RST is at a low level or a high level.

The logic circuit 64[i] generates the output signal $S_{PWM}[i]$ based on the signals SET[i] and RST[i]. The switching operation of the $i^{th}$ channel is described with reference to FIG. 6. Moreover, in FIG. 6, it is assumed that the signals $V_{SLP}'[i]$ and $V_{SLP}[i]$ are consistent with each other, and the signals $V_{ERR}$ and $V_{CMP}[i]$ are consistent with each other.

The logic circuit 64[i] is synchronous with the rising edge of the signal SET[i], such that a rising edge of the signal $S_{PWM}[i]$ is generated. Upon receiving the rising edge of the signal $S_{PWM}[i]$, the drive circuit 50[i] turns on the switching transistor 11[i]. When the switching transistor 11[i] is turned on, the coil current $I_L[i]$ flows through the switching transistor 11[i]. During the ON period of the switching transistor 11[i], the coil current $I_L[i]$ gradually increases, and in conjunction with this, the potentials of the signals $V_{SLP}'[i]$ and $V_{SLP}[i]$ also gradually increase. Moreover, at a time when the potential of the signal $V_{SLP}[i]$ reaches the potential of the signal $V_{CMP}[i]$ and "$V_{SLP}[i] > V_{CMP}[i]$" holds true, a rising edge of the signal RST[i] is generated.

The logic circuit 64[$i$] is synchronous with the rising edge of the signal RST[i], such that a falling edge of the signal $S_{PWM}$[i] is generated. Upon receiving the falling edge of the signal $S_{PWM}$[i], the drive circuit 50[$i$] turns off the switching transistor 11[$i$]. When the switching transistor 11[$i$] is turned off, based on the accumulative energy of the coil 12[$i$], the coil current $I_L$[i] flows to the output terminal OUT through the rectifier diode 13[$i$]. During the OFF period of the switching transistor 11[$i$], the accumulative energy of the coil 12[$i$] gradually decreases, and accordingly the size of the coil current $I_L$[i] also gradually decreases. Moreover, accompanied with the turning off of the switching transistor 11[$i$], the potential of the signal $V_{SLP}$[i] lowers drastically, so the high-potential period of the signal RST[i] is smaller. The above operation is carried out according to each PWM period. For each channel, a current corresponding to a target current (the current flowing through the switching transistor 11 during the ON period of the switching transistor 11) from the connection node 15 between the switching transistor 11 and the coil 12 is supplied to the output terminal OUT, and the output voltage $V_{OUT}$ is accordingly generated. At this point, the control device 2 generates the signals $S_{PWM}$[1] to $S_{PWM}$[n] such that the feedback voltage $V_{FB}$ and the reference voltage $V_{REF}$ are consistent, and so the output voltage $V_{OUT}$ is stabilized by means of a voltage dividing ratio between the resistors R1 and R2 to approach a target voltage determined according to the reference voltage $V_{ERR}$.

Figure 6:
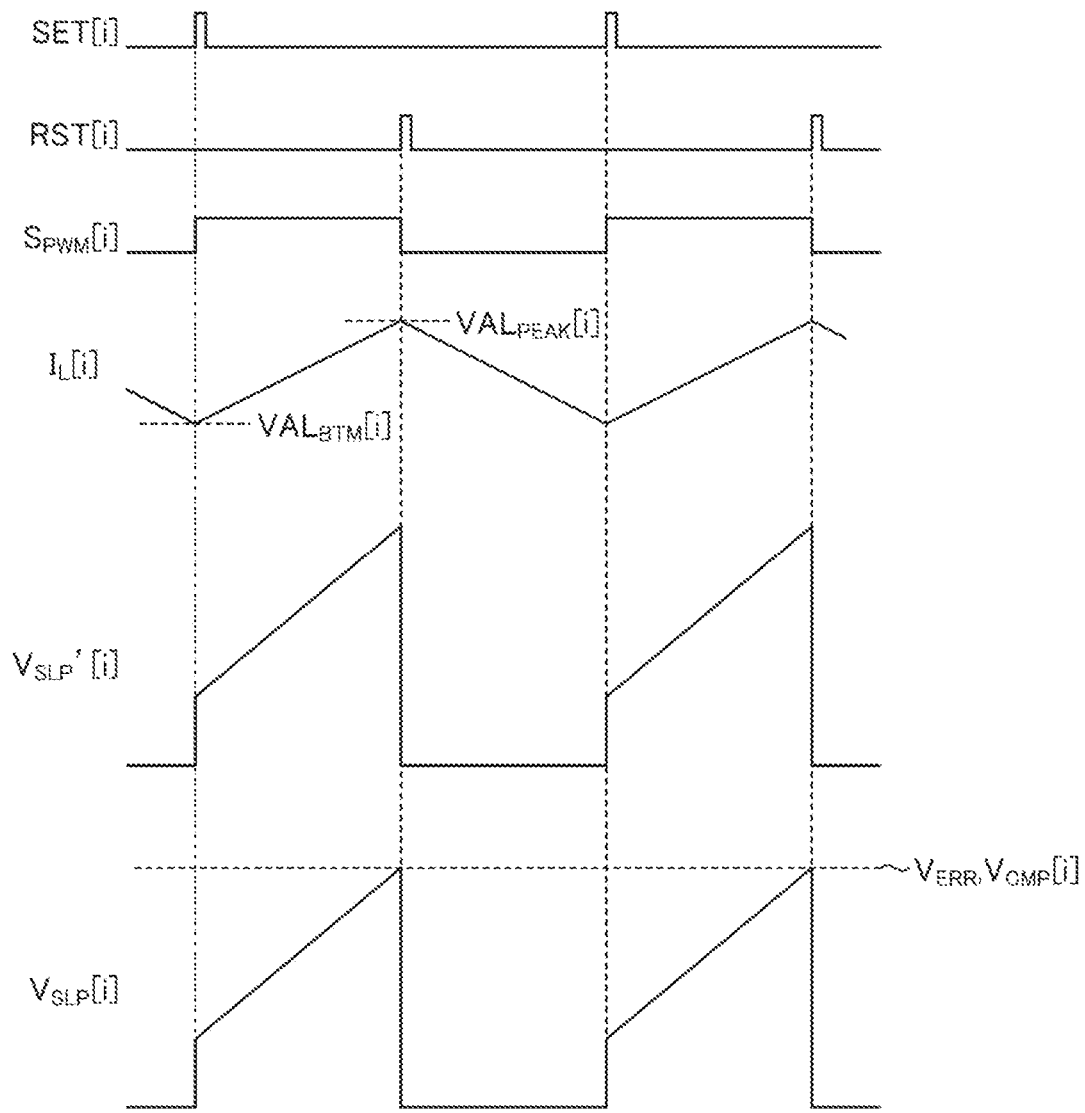
FIG. 6 is a signal waveform diagram of illustrating a switching operation according to an embodiment of the disclosure.

Moreover, in each PWM period, a maximum value of the coil current $I_L$[i] is called as a peak value and is referred to by the denotation "$VAL_{PEAK}$[i]", and a minimum value of the coil current $I_L$[i] is called as a bottom value and is referred to by the denotation "$VAL_{BTM}$[i]" (referring to FIG. 6). In each PWM period, the coil current $I_L$[i] has the peak value when the switching transistor 11[$i$] switches from the ON period to the OFF period. In each PWM period, the coil current $I_L$[i] has the bottom value when the switching transistor 11[$i$] switches from the OFF period to the ON period.

Next, the current detection circuit 30 is to be described. The current detection circuit 30 samples the current corresponding signal $V_{CS}$ at the target time in the ON period of the switching transistor 11 for each channel, and converts the current corresponding signal $V_{CS}$ at the target time to a digital signal by means of A/D conversion. The target time is equivalent to the sampling time in A/D conversion. Herein, the target time is set to be the time at which the coil current $I_L$ has the peak value. At the moment when or the moment before the switching transistor 11[$i$] is turned off, the coil current $I_L$[i] obtains the peak value. Thus, for example, the current detection circuit 30 can use the rising edge time of the signal RST[i] or the falling edge time of the signal $S_{PWM}$ [i] as the target time for the $i^{th}$ channel for processing. In addition, the current detection circuit 30 can convert the current corresponding signal $V_{CS}$[i] to a digital signal by means of A/D conversion at the rising edge time of the signal RST[i] or the falling edge time of the signal $S_{PWM}$ [i], and accordingly acquires the detected current value $I_{CS}$[i]. In this case, the detected current value $I_{CS}$[i] is equivalent to the peak value $VAL_{PEAK}$[i] of the coil current $I_L$[i].

However, in a multi-phase DC/DC converter, due to the deviation of inductances value among multiple coils, the balance of the current may collapse, and there is a concern that the current is concentrated in the coil of a specific channel. In the DC/DC converter 1 of the embodiment, the current balance circuit 80 effectively functions to appropriately maintain the balance among the coils.

In the multiple embodiments below, several specific operation examples, application techniques and variation techniques of the DC/DC converter 1 (and more particularly the current balance circuit 80) are described. Unless otherwise specified and without any contradiction, the items enumerated in this embodiment are applicable to the various embodiments below. In the various embodiments, the description of the embodiments can be considered as over-ruling in case of any items contradictory from the items described above. Moreover, provided that there are no contradictions, the items described in any one of the embodiments below are also applicable to any other embodiment (that is to say, any two or more of the embodiments can be combined).

First Embodiment

Figure 7:
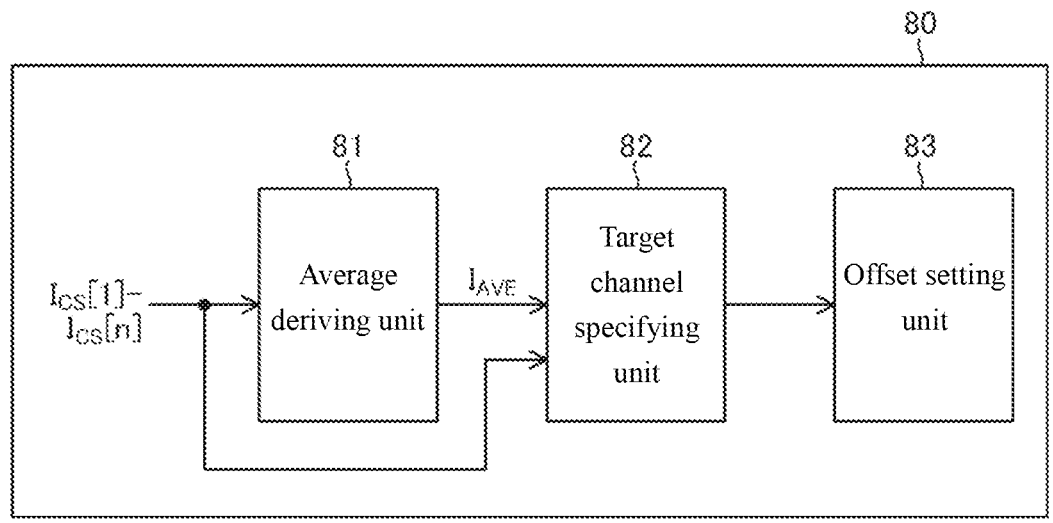
FIG. 7 is an internal block diagram of a current balance circuit according to a first embodiment of the embodiments of the disclosure.

A first embodiment is described. FIG. 7 shows an internal block diagram of the current balance circuit 80. The current balance circuit 80 may be formed by a digital circuit. The current balance circuit 80 includes an average deriving unit 81, a target channel specifying unit 82 and an offset setting unit 83.

The average deriving unit 81 derives the average value of the detected current values $I_{CS}$[1] to $I_{CS}$[n]. The denotation "$I_{AVE}$" is used to refer to the average value of the detected current values $I_{CS}$[1] to $I_{CS}$[n]. Moreover, as shown in FIG. 2, digital signals representing the detected current values $I_{CS}$[1] to $I_{CS}$[n] are input from the current detection circuit 30 to the current balance circuit 80.

The target channel specifying unit 82 specifies, based on the detected current values $I_{CS}$[1] to $I_{CS}$[n] and average value $I_{AVE}$, the channel corresponding to the largest detected current value, among the detected current values $I_{CS}$[1] to $I_{CS}$[n], with the largest difference from the average value $I_{AVE}$ as the target channel. That is to say, the target channel specifying unit 82 obtains a difference DIV[i] between the detected current value $I_{CS}$[i] and the average value $I_{AVE}$ for each integer i that satisfies "1≤i≤n". An absolute value of the difference DIF[i] is denoted as "|DIF[i]|". Moreover, the target channel specifying unit 82 specifies the channel corresponding to the largest absolute value among the absolute values |DIF[1]| to |DIF[n]| as the target channel. Thus, for example, among the absolute values |DIF[1]| to |DIF[n]|, the $1^{st}$ channel is specified as the target channel if the absolute value |DIF[1] is the largest, and the $2^{nd}$ channel is specified as the target channel if |DIF[2]| is the largest. It is assumed that, among the absolute values |DIF[1]| to |DIF[n]|, two or more absolute values are the largest, the channel assigned with the smaller channel number between the two or more channels corresponding to the two or more absolute values is specified as the target channel.

The offset setting unit 83 sets the offset signal to be superimposed in the offset superposition circuit 62 of each channel. At this point, if the target channel is the $i^{th}$ channel, the offset setting unit 83 adjusts the offset signal of the target channel such that the value (the peak value of the coil current $I_L$ herein) corresponding to the target current in the $i^{th}$ channel approaches the average value $I_{AVE}$. Accordingly, if the target channel is the $i^{th}$ channel, the peak value of the coil current $I_L$[i] approaches the average value of the peaks of the coil currents $I_L$[1] to $I_L$[n], and as a result, the coil currents $I_L$[1] to $I_L$[n] become approximately equal.

Figure 8:
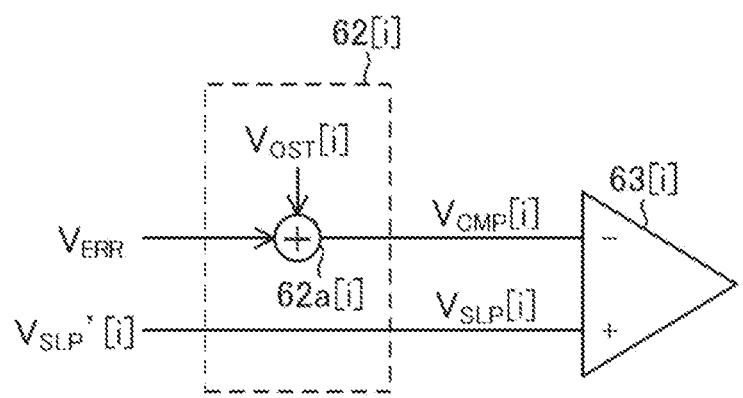
FIG. 8 is an internal structural diagram of an offset superposition circuit according to the first embodiment of the embodiments of the disclosure.

Since the internal structures of the modulation blocks 60[1] to 60[$n$] are common, such is used to represent the internal structure of the offset superposition circuit 62[$i$] of the first embodiment as shown in FIG. 8. In each modulation block 60, the offset superposition circuit 62 includes an adder 62a, which superimposes an offset signal $V_{OST}$ on the error signal $V_{ERR}$ to generate the signal $V_{CMP}$. More particularly, the denotations "62a[i]" and "$V_{OST}$[i]" are used to refer to the adder 62a and the offset signal $V_{OST}$ in the offset superposition circuit 62[i]. In the first embodiment, the signal $V_{CMP}$[i] is a signal summed from the error signal $V_{ERR}$ and the offset signal $V_{OST}$[i]. That is to say, the offset signal $V_{OST}$[i] is superimposed in the signal $V_{CMP}$[i] based on the error signal $V_{ERR}$. On the other hand, in the first embodiment, the signal $V_{SLP}$[i] is the ramp signal $V_{SLP}'$[i] itself.

The offset setting unit 83 sets the offset signal $V_{OST}$ for each modulation block 60, that is, sets the offset signals $V_{OST}$[1] to $V_{OST}$[n].

Figure 9:
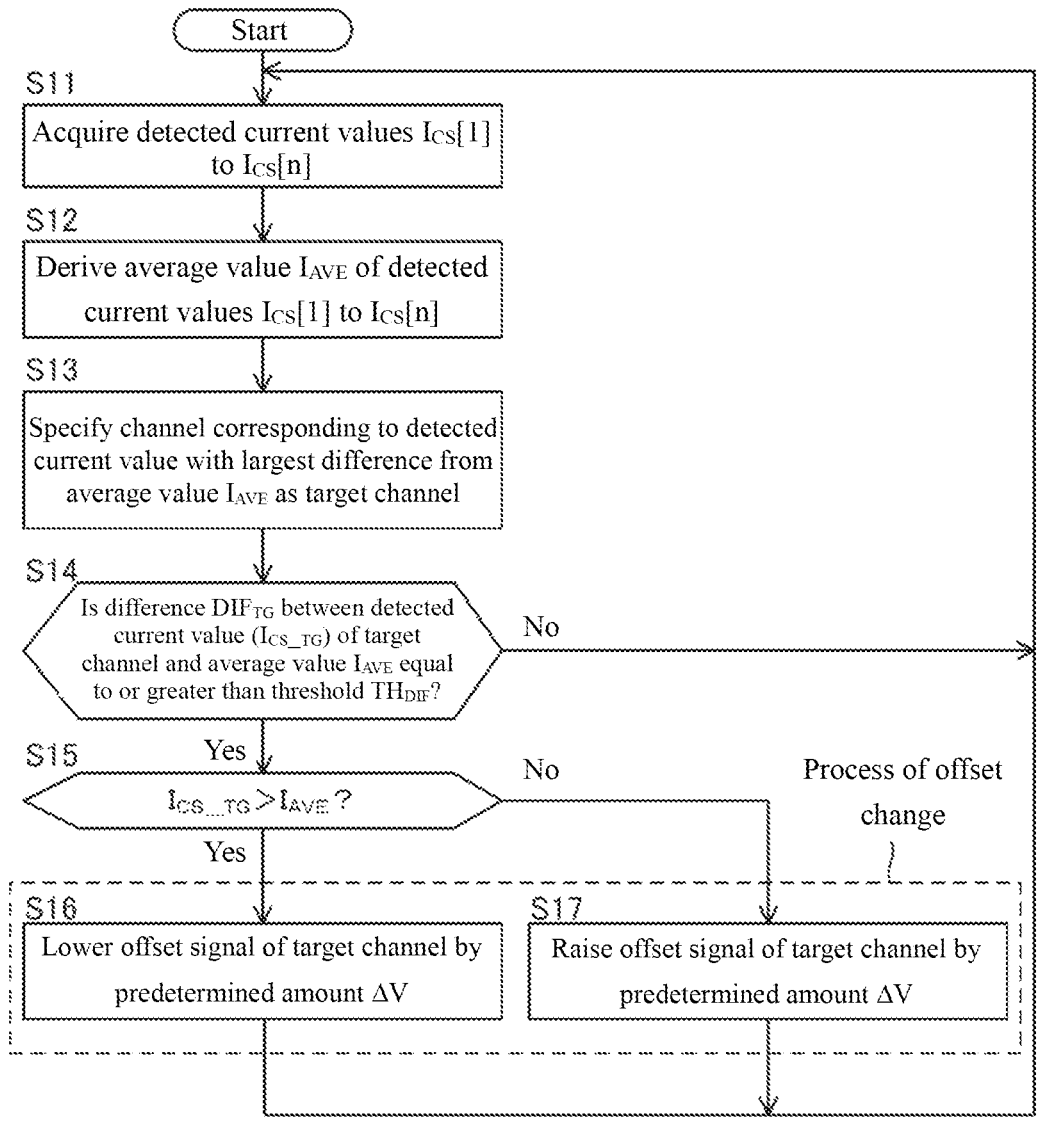
FIG. 9 is an operation flowchart of a control device concerning the operation of an offset setting unit according to the first embodiment of the embodiments of the disclosure.

FIG. 9 shows an operation flowchart of the control device 2 concerning the operation of the offset setting unit 83. The initial values of the offset signals $V_{OST}$[1] to $V_{OST}$[n] are zero. Thus, in an initial state of the control device 2, in each modulation block 60, $V_{CMP}=V_{ERR}$, and $V_{SLP}=V_{SLP}'$. Step S11 is reached after the control device 2 is activated and starts to use the switches of the switching transistors 11[1] to 11[n] of the drive circuits 50[1] to 50[n].

In step S11, the current detection circuit 30 acquires the detected current values $I_{CS}$[1] to $I_{CS}$[n]. The detected current values $I_{CS}$[1] to $I_{CS}$[n] acquired in step S11 are the latest detected current values $I_{CS}$[1] to $I_{CS}$[n] that can be acquired at this time point. In step S12 that follows step S11, the average deriving unit 81 derives the average value $I_{AVE}$ of the detected current values $I_{CS}$[1] to $I_{CS}$[n] acquired in step S11. The process proceeds to step S13 after step S12.

In step S13, the target channel specifying unit 82 specifies the channel corresponding to the detected current value, among the detected current values $I_{CS}$[1] to $I_{CS}$[n], with the largest difference from the average value $I_{AVE}$ as the target channel according to the detected current values $I_{CS}$[1] to $I_{CS}$[n] acquired in step S11 and the average value $I_{AVE}$ derived in step S12. The process proceeds to step S14 after step S13. Moreover, the denotation "$I_{CS\_TG}$" below is used to represent the detected current value $I_{CS}$ of the target channel.

In step S14, the offset setting unit 83 derives a difference $DIF_{TG}$ between the detected current value $I_{CS\_TG}$ of the target channel and the average value $I_{AVE}$, and determines whether the difference $DIF_{TG}$ is equal to or greater than a predetermined positive threshold $TH_{DIF}$. It is assumed that "$DIF_{TG}>0$" herein. That is to say, the difference $DIF_{TG}$ is derived by subtracting either of the detected current value $I_{CS\_TG}$ and the average value $I_{AVE}$ from the other so that "$DIF_{TG} \geq 0$". The difference $DIF_{TG}$ may be understood as the value of the difference between the detected current value $I_{CS\_TG}$ and the average value $I_{AVE}$. If the difference $DIF_{TG}$ is equal to or greater than the threshold $TH_{DIF}$ ("Yes" from step S14), step S15 follows step S14. If the difference $DIF_{TG}$ is less than the threshold $TH_{DIF}$ ("No" from step S14), the process returns to step S11 from step S14.

In step S15, the offset setting unit 83 determines whether "$I_{CS\_TG}>I_{AVE}$" holds true. When "$I_{CS\_TG}>I_{AVE}$" holds true ("Yes" from step S15), step S16 follows step S15. When "$I_{CS\_TG}>I_{AVE}$" is false ("No" from step S15), step S17 follows step S15.

In step S16, the offset setting unit 83 lowers the offset signal $V_{OST}$ of the target channel by a predetermined amount $\Delta V$. The process then returns to step S11. In step S17, the offset setting unit 83 raises the offset signal $V_{OST}$ of the target channel by the predetermined amount $\Delta V$. The process then returns to step S11. The predetermined amount $\Delta V$ is a positive voltage amount.

The processes performed in step S16 and step S17 are processes of offset change (in other words, processes of offset update) for the offset signal $V_{OST}$ of the target channel. In the process of offset change of step S16, the offset signal $V_{OST}$ of the target channel is lowered by the predetermined amount $\Delta V$ (the offset signal $V_{OST}$ of the target channel is updated by means of lowering the offset signal $V_{OST}$ of the target channel by the predetermined amount $\Delta V$). In the process of offset change of step S17, the offset signal $V_{OST}$ of the target channel rises by the predetermined amount $\Delta V$ (the offset signal $V_{OST}$ of the target channel is updated by means of raising the offset signal $V_{OST}$ of the target channel by the predetermined amount $\Delta V$). Moreover, the so-called lowering, rising/raising, changing and updating of the offset signal $V_{OST}$ are specifically lowering, rising/raising, changing and updating of the potential of the offset signal $V_{OST}$. The same applies to the adjusting of the offset signal $V_{OST}$, as well as to other voltage signals.

The offset signal $V_{OST}$ of each channel has a zero voltage value, or has a positive or negative voltage value. If step S16 is reached while the offset signal $V_{OST}$ of the target channel has a zero voltage value, the potential of the offset signal $V_{OST}$ of the target channel is updated to a potential ($-\Delta V$). If step S17 is reached while the offset signal $V_{OST}$ of the target channel has a zero voltage value, the potential of the offset signal $V_{OST}$ of the target channel is updated to a potential $\Delta V$.

It is considered that the target channel is the $i^{th}$ channel. In this case, the value of the target current in the $i^{th}$ channel, that is, the detected current value $I_{CS}$[i], is equivalent to the detected current value $I_{CS\_TG}$ of the target channel.

When the detected current value $I_{CS}$[i] of the detected current value $I_{CS\_TG}$ of the target channel is greater than the average value $I_{AVE}$, the offset signal $V_{OST}$[i] of the $i^{th}$ channel (target channel) is lowered by the predetermined amount $\Delta V$ to update the offset signal $V_{OST}$[i] (step S16). The lowering of the offset signal $V_{OST}$[i] lowers the signal $V_{CMP}$[i], and the lowering of the signal $V_{CMP}$[i] shortens the high level period of the signal $S_{PWM}$[i]. As a result, the value of the target current (the current flowing through the switching transistor 11[i] during the ON period of the switching transistor 11[i]) in the $i^{th}$ channel lowers to approach the average value $I_{AVE}$. That is to say, the offset signal $V_{OST}$[i] is adjusted such that the value of the target current in the $i^{th}$ channel approaches the average value $I_{AVE}$.

Conversely, when the detected current value $I_{CS}$[i] of the detected current value $I_{CS\_TG}$ of the target channel is less than the average value $I_{AVE}$, the offset signal $V_{OST}$[i] of the $i^{th}$ channel (target channel) rises by the predetermined amount $\Delta V$ to update the offset signal $V_{OST}$[i] (step S17). The rising of the offset signal $V_{OST}$[i] raises the signal $V_{CMP}$[i], and the rising of the signal $V_{CMP}$[i] lengthens the high level period of the signal $S_{PWM}$[i]. As a result, the value of the target current (the current flowing through the switching transistor 11[i] during the ON period of the switching transistor 11[i]) in the $i^{th}$ channel increases to approach the average value $I_{AVE}$. That is to say, the offset signal $V_{OST}$[i] is adjusted such that the value of the target current in the $i^{th}$ channel approaches the average value $I_{AVE}$.

When the process returns to step S11 from step S14, S16 or S17, in the next PWM period or after the time of one or more PWM period has elapsed, the processes after step S11 are again performed. During the repeating of the series of processes from step S11, the target channel may be constantly changed.

FIG. 10, it is assumed that "n=4" as a simple numerical example. In the numerical example in FIG. 10, a current value "100" means that the current value is (100×k) amps (for example, "k=30"). The series of processes from the process of step S11 to returning to step S11 are referred to as one cycle. In the control device 2, a $1^{st}$ cycle, a $2^{nd}$ cycle, a $3^{rd}$ cycle . . . are sequentially performed. Moreover, it is assumed that a load current is fixed in the numerical example in FIG. 10.

In the example in FIG. 10, in steps S11 and S12 of the $1^{st}$ cycle, "$(I_{CS}[1], I_{CS}[2], I_{CS}[3], I_{CS}[4], I_{AVE})$=(99, 111, 92, 98, 100)". Thus, in the $1^{st}$ cycle, the $2^{nd}$ channel becomes the target channel. Since "$I_{CS\_TG}=I_{CS}[2]>I_{AVE}$", the process of offset change of lowering the offset signal $V_{OST}[2]$ of the $2^{nd}$ channel by the predetermined amount $\Delta V$ is performed (step S16). Accordingly, the signal $V_{CMP}[2]$ lowers, and the lowering of the signal $V_{CMP}[2]$ functions such that the coil current $I_L[2]$ of the $2^{nd}$ channel and the target current (hence $I_{CS}[2]$) are lowered. However, as the coil current $I_L[2]$ lowers while the coil currents $I_L[1]$, $I_L[3]$ and $I_L[4]$ stay constant, the output voltage $V_{OUT}$ lowers such that the error signal $V_{ERR}$ rises. Thus, with the rising of the signals $V_{CMP}[1]$, $V_{CMP}[3]$ and $V_{CMP}[4]$, the coil currents $I_L$ of the $1^{st}$ $3^{rd}$ and $4^{th}$ channels and the target current (hence $I_{CS}[1]$, $I_{CS}[3]$ and $I_{CS}[4]$) rise slightly.

As a result of the process of offset change of the $1^{st}$ cycle, in steps S11 and S12 of the $2^{nd}$ cycle, "$(I_{CS}[1], I_{CS}[2], I_{CS}[3], I_{CS}[4], I_{AVE})$=(100, 108, 93, 99, 100)". Thus, in the $2^{nd}$ cycle, the $2^{nd}$ channel becomes the target channel. Since "$I_{CS\_TG}=I_{CS}[2]>I_{AVE}$", the process of offset change of lowering the offset signal $V_{OST}[2]$ of the $2^{nd}$ channel by the predetermined amount $\Delta V$ is performed (step S16). Accordingly, the signal $V_{CMP}[2]$ lowers, and the lowering of the signal $V_{CMP}[2]$ functions such that the coil current $I_L[2]$ of the $2^{nd}$ channel and the target current (hence $I_{CS}[2]$) are lowered. However, as the coil current $I_L[2]$ lowers while the coil currents $I_L[1]$, $I_L[3]$ and $I_L[4]$ stay constant, the output voltage $V_{OUT}$ lowers such that the error signal $V_{ERR}$ rises. Thus, with the rising of the signals $V_{CMP}[1]$, $V_{CMP}[3]$ and $V_{CMP}[4]$, the coil currents $I_L$ of the $1^{st}$, $3^{rd}$ and $4^{th}$ channels and the target current (hence $I_{CS}[1]$, $I_{CS}[3]$ and $I_{CS}[4]$) rise slightly.

As a result of the process of offset change of the $2^{nd}$ cycle, in steps S11 and S12 of the $3^{rd}$ cycle, "$(I_{CS}[1], I_{CS}[2], I_{CS}[3], I_{CS}[4], I_{AVE})$=(101, 105, 94, 100, 100)". Thus, in the $3^{rd}$ cycle, the $3^{rd}$ channel becomes the target channel. Since "$I_{CS\_TG}=I_{CS}[1]<I_{AVE}$", the process of offset change of raising the offset signal $V_{OST}[3]$ of the $3^{rd}$ channel by the predetermined amount $\Delta V$ is performed (step S17). Accordingly, the signal $V_{CMP}[3]$ rises, and the rising of the signal $V_{CMP}[3]$ functions such that the coil current $I_L[3]$ of the $3^{rd}$ channel and the target current (hence $I_{CS}[3]$) are increased. However, as the coil current $I_L[3]$ increases while the coil currents $I_L[1]$, $I_L[2]$ and $I_L[4]$ stay constant, the output voltage $V_{OUT}$ rises such that the error signal $V_{ERR}$ lowers. Thus, with the lowering of the signals $V_{CMP}[1]$, $V_{CMP}[2]$ and $V_{CMP}[4]$, the coil currents $I_L$ of the $1^{st}$, $2^{nd}$ and $4^{th}$ channels and the target current (hence $I_{CS}[1]$, $I_{CS}[2]$ and $I_{CS}[4]$) lower slightly.

As a result of the process of offset change of the $3^{rd}$ cycle, in steps S11 and S12 of the $4^{th}$ cycle, "$(I_{CS}[1], I_{CS}[2], I_{CS}[3], I_{CS}[4], I_{AVE})$=(100, 104, 97, 99, 100)". Thus, in the $4^{th}$ cycle, the $2^{nd}$ channel becomes the target channel. Since "$I_{CS\_TG}=I_{CS}[2]>I_{AVE}$", the process of offset change of lowering the offset signal $V_{OST}[2]$ of the $2^{nd}$ channel by the predetermined amount $\Delta V$ is performed (step S16). Accordingly, the signal $V_{CMP}[2]$ lowers, and the lowering of the signal $V_{CMP}[2]$ functions such that the coil current $I_L[2]$ of the $2^{nd}$ channel and the target current (hence $I_{CS}[2]$) are lowered. However, as the coil current $I_L[2]$ lowers while the coil currents $I_L[1]$, $I_L[3]$ and $I_L[4]$ stay constant, the output voltage $V_{OUT}$ lowers such that the error signal $V_{ERR}$ rises. Thus, with the rising of the signals $V_{CMP}[1]$, $V_{CMP}[3]$ and $V_{CMP}[4]$, the coil currents $I_L$ of the $1^{st}$, $3^{rd}$ and $4^{th}$ channels and the target current (hence $I_{CS}[1]$, $I_{CS}[3]$ and $I_{CS}[4]$) rise slightly.

As a result of the process of offset change of the 4' cycle, in steps S11 and S12 of the $5^{th}$ cycle, "$(I_{CS}[1], I_{CS}[2], I_{CS}[3], I_{CS}[4], I_{AVE})$=(101, 101, 98, 100, 100)". Thus, in the 5' cycle, the $3^{rd}$ channel becomes the target channel. However, "$TH_{DIF}$=3" in the example in FIG. 10. Thus, since the determination result of step S14 in FIG. 9 is negative, the process of offset change is not performed and the $5^{th}$ cycle ends.

As such, the PWM modulation circuit 40 repeats the process of offset change until the difference between the detected current value $I_{CS\_TG}$ of the target channel and the average value $I_{AVE}$ is less than the threshold $TH_{DIF}$. Accordingly, equalization of the coil current $I_L$ can be achieved. After the $5^{th}$ cycle, the series of processes starting from step S11 are periodically performed. Thus, after the determination result of step S14 is negative, when the determination result of step S14 becomes positive due to such as temperature changes of the DC/DC converter 1, the process of offset change is again performed.

Second Embodiment

A second embodiment is described. In the first embodiment, the offset signal is superimposed on the signal $V_{CMP}$; in the second embodiment, the offset signal is superimposed on the signal $V_{SLP}$. Apart from the above, the second embodiment is the same as the first embodiment. However, in the second embodiment, the offset signal superimposed on the signal $V_{SLP}$ is a polarity-inverted signal of the offset signal superimposed on the signal $V_{SLP}$ in the first embodiment.

Figure 11:
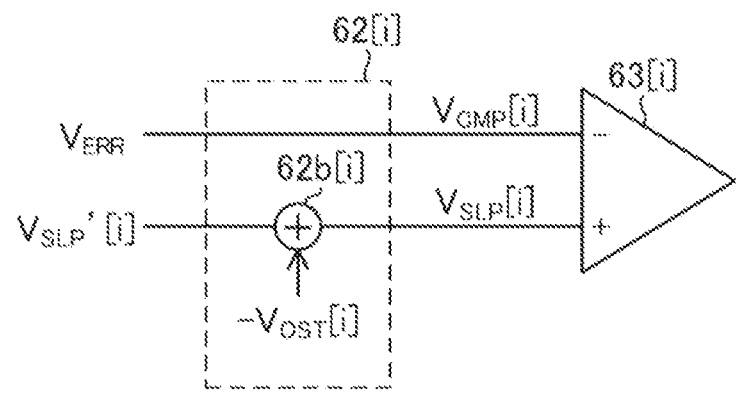
FIG. 11 is an internal structural diagram of an offset superposition circuit according to a second embodiment of the embodiments of the disclosure.

FIG. 11 shows an internal structure of the offset superposition circuit 62[i] of the second embodiment. In each modulation block 60, the offset superposition circuit 62 includes an adder 62b, which superimposes an offset signal $(-V_{OST})$ on the ramp signal $V_{SLP}'$ to generate the signal $V_{SLP}$. More particularly, the denotations "62a[i]" and "$-V_{OST}[i]$" are used to refer to the adder 62b in the offset superposition circuit 62[i] and the offset signal $(-V_{OST})$, respectively. The offset signal $(-V_{OST})$ is a polarity-inverted signal of the offset signal $V_{OST}[i]$ in the first embodiment. In the second embodiment, the signal $V_{SLP}[i]$ is a signal summed from the ramp signal $V_{SLP}'$ and the offset signal $(-V_{OST}[i])$. In other words, the signal $V_{SLP}[i]$ in the second embodiment is a signal of subtracting the offset signal $V_{OST}[i]$ from the ramp signal $V_{SLP}'$. As such, in the second embodiment, the offset signal $(-V_{OST}[i])$ is superimposed on the signal $V_{SLP}[i]$ based on the ramp signal $V_{SLP}'$. On the other hand, in the second embodiment, the signal $V_{CMP}[i]$ is the error signal $V_{ERR}$ itself.

Superimposing the offset signal $V_{OST}[i]$ on the signal $V_{CMP}[i]$ is equivalent to superimposing the polarity-inverted signal (that is, $-V_{OST}[i]$) of the offset signal $V_{OST}[i]$ on the signal $V_{SLP}[i]$.

Third Embodiment

A third embodiment is described. In the first or second embodiment, the current balance circuit 80 may also obtain the offset between the detected current amount $I_{CS}[i]$ and the average value $I_{AVE}$ for each channel, and set the offset signal $V_{OST}[i]$ corresponding to the offset for each channel.

That is to say, the current balance circuit 80 of the third embodiment obtains the offset for each channel. The denotation "$I_{DV}[i]$" is used to represent the offset of the $i^{th}$ channel. Herein, "$I_{DV}[i]=I_{AVE-ICS}[i]$". In addition, the current balance circuit 80 sets a value obtained by multiplying the offset by a gain coefficient $k_G$ as the offset signal $V_{OST}$ for each channel. That is to say, "$V_{OST}[i]=I_{DV}[i]$"×$k_G$", where $k_G$ is a positive constant coefficient.

The current balance circuit 80 sets the offset signals $V_{OST}[1]$ to $V_{OST}[n]$ according to "$V_{OST}[i]=I_{DV}[1]\times k_G$". In addition, in a combination of the first embodiment and the third embodiment (referring to FIG. 8), for each channel, the offset signal $V_{OST}[i]$ is provided to the adder 62a[i] to generate the signal $V_{CMP}[i]$. In a combination of the second embodiment and the third embodiment (referring to FIG. 11), the offset signal $(-V_{OST}[i])$ is provided to the adder 62b[i] to generate the signal $V_{SLP}[i]$.

After the offset signals $V_{OST}[1]$ to $V_{OST}[n]$ are set according to "$V_{OST}[i]=I_{DV}[i]$"×$k_G$", the offset signals $V_{OST}[1]$ to $V_{OST}[n]$ may stay unchanged until the power supplied to the control device 2 is interrupted and the operation of the control device 2 stops. Alternatively, after the offset signals $V_{OST}[1]$ to $V_{OST}[n]$ are set according to "$V_{OST}[i]I_{DV}[i]$"× $k_G$", the operation in FIG. 9 may be performed.

Fourth Embodiment

A fourth embodiment is described. As described above, the current detection signal 30 samples the current corresponding signal $V_{CS}$ at the target time in the ON period of the switching transistor 11 for each channel, and converts the current corresponding signal $V_{CS}$ at the target time to a digital signal by means of A/D conversion. Although the time at which the coil current $I_L$ has a peak value is used as the target time for illustrations herein, the target time is not limited to such example. For example, the time at which the coil current $I_L$ has a bottom value may also be used as the target time. That is to say, the detected current value $I_{CS}[i]$ may be equivalent to the bottom value $VAL_{BTM}[i]$ of the coil current $I_L[i]$ (referring to FIG. 6).

Moreover, for example, the current detection circuit 30 may set a time after a predetermined time has elapsed from the rising edge time of the signal SET[i] or $S_{PWM}[i]$ as the target time, and convert the current corresponding signal $V_{CS[i]}$ at the target time to a digital signal by means of A/D conversion to thereby obtain the detected current value $I_{CS}[i]$.

Fifth Embodiment

Figure 12:
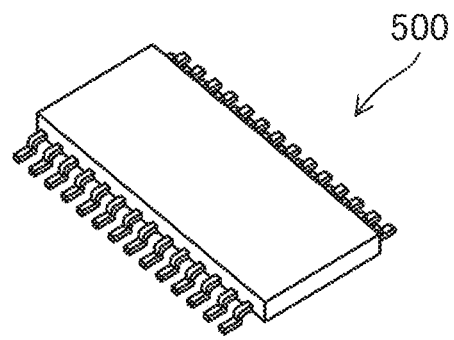
FIG. 12 is a perspective diagram of the appearance of a semiconductor device according to a fifth embodiment of the disclosure.

A fifth embodiment is described. The DC/DC converter 1 is formed by using a semiconductor device consisting of one or more semiconductor integrated circuits. The semiconductor device herein refers to such as a semiconductor device 500 shown in FIG. 12. The semiconductor device 500 is an electronic component including: a semiconductor chip, having a semiconductor integrated chip formed on a semiconductor substrate; a housing (a package), accommodating the semiconductor chip; and a plurality of external terminals, exposed outside the semiconductor device 500 from the housing. The semiconductor device 500 is formed by packaging the semiconductor chip in the housing (package) formed by a resin. Moreover, the number of the external terminals of the semiconductor device 500 and the type of the housing of the semiconductor device 500 shown in FIG. 12 are merely examples, and may be implemented by any designed as desired. Terminals built-in the semiconductor device 500 are referred to as internal terminals. The internal terminals are terminals that are not exposed from the housing of the semiconductor device 500.

The control device 2 (FIG. 1 or FIG. 2) may be one semiconductor device. In this case, the plurality of external terminals provided at the one semiconductor device include drive terminals DO[1] to DO[n], current detection terminals CS[1] to CS[n] and a feedback terminals FB, and the error amplifier 20, the current detection circuit 30, the PWM modulation circuit 40 and the drive circuits 50[1] to 50[n] are accommodated in the housing of the one semiconductor device. The switching transistors 11[1] to 11[n] may be accommodated in the semiconductor device in some cases, and in these cases, the drive terminals DO[1] to DO[n] become internal terminals. Moreover, the switching transistors 11[1] to 11[n] and the sense resistors 14[1] to 14[n] may be accommodated in the semiconductor device in some cases, and in these cases, the drive terminals DO[1] to DO[n] and the current detection terminals CS[1] to CS[n] become internal terminals.

The control device 2 (FIG. 1 or FIG. 2) may be formed by multiple semiconductor devices. That is to say, the control device 2 may be formed by $1^{st}$ to $(n+1)^{th}$ semiconductor devices separated from one another. In this case, the drive circuits 50[1] to 50[n] are accommodated in the 1st to $(n+1)^{th}$ semiconductor devices, respectively. The switching transistors 11[1] to 11[n] may be respectively accommodated in the 1st to $n^{th}$ semiconductor devices in some cases, and the sense resistors 14[1] to 14[n] may also be similarly respectively accommodated in some cases. The error amplifier 20, the current detection circuit 30 and the PWM modulation circuit 40 are accommodated in the $(n+1)^{th}$ semiconductor device. Each of the $1^{st}$ to $(n+1)^{st}$ semiconductor devices have the same structure as the semiconductor device 500. However, more particularly, for example, when comparing the $1^{st}$ to $n^{th}$ semiconductor with the $(n+1)^{th}$ semiconductor device, the numbers of the external terminals and the shapes of housings may be different between the former and the latter.

Sixth Embodiment

A sixth embodiment is described. Although the DC/DC converter 1 using a structure of diode rectification is given as an example, synchronous rectification may also be used in the DC/DC converter 1. In this case, the rectifying elements 13 of the channels are replaced by synchronous rectifying transistors, and the control device 2 controls the turning on and turning off of the synchronous rectifying transistors serving as the rectifying elements 13. More specifically, the synchronous rectifying transistors are controlled to be turned on during an OFF period of the switching transistors 11, and are controlled to be turned off during the ON period of the switching transistors 11.

Moreover, although the configuration of the step-up DC/DC converter is given as an example of the DC/DC converter 1, the technique of the disclosure may also be applied to a step-down DC/DC converter or a step-up/step-down DC/DC converter. That is to say, the DC/DC converter 1 may be modified to be a step-down DC/DC converter or a step-up/step-down DC/DC converter, provided that the output-stage circuits 10 of the channels are modified for stepping up or stepping up/stepping down.

Figure 13:
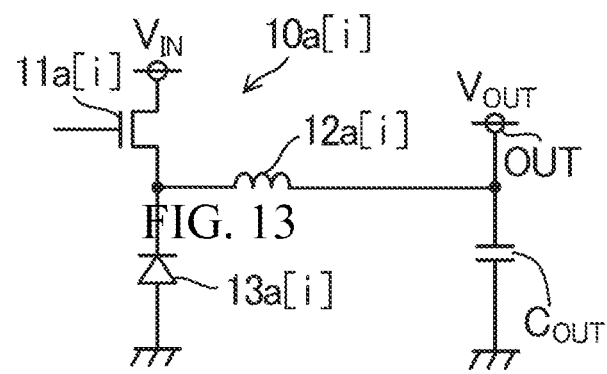
FIG. 13 is a circuit diagram of an output-stage circuit according to a sixth embodiment of the embodiments of the disclosure.

For example, when the DC/DC converter 1 is modified to be a step-down DC/DC converter, the output-stage circuit 10[i] is replaced by an output-stage circuit 10a[i] in FIG. 13. The output-stage circuit 10a[i] includes a switching transistor 11a[i] formed by an N-channel MOSFET, a coil 12a[i] and a rectifying element 13a[i]. In FIG. 13, the rectifying element 13a[i] is a rectifier diode. The drain of the switching transistor 11a[i] is connected to a terminal to which the input voltage $V_{IN}$ is applied. The source of the switching transistor 11a[i] and the cathode of the rectifier diode 13a[i] are connected to a first end of the coil 12a[i]. A second end of the coil 12a[i] is connected to the output terminal OUT. The anode of the rectifier diode 13a[i] is grounded. A generally known current detection mechanical is used to apply a signal proportional to the current flowing through the switching transistor 11a[i] during an ON period of the switching transistor 11a[i] to the current detection terminal CS[i]. The rectifier element 13a[i] may also be implemented by a synchronous rectifier transistor.

Seventh Embodiment

A seventh embodiment is described. Other variation examples are described in the seventh embodiment.

For an arbitrary signal or voltage, the relation between the high level and the low level thereof may be opposite to the relation described, provided that the form of the subject is not compromised.

The types of the channels of the field-effect transistors (FET) shown in the embodiments are examples. Without compromising the form of the subject, the type of channels of FETs may be changed between P-type channels and N-type channels.

Given that no inappropriateness is incurred, an arbitrary transistor may also be any type of transistor. For example, given that no inappropriateness is incurred, an arbitrary transistor implemented by a MOSFET may be replaced by a junction FET, an insulated gate bipolar transistor (IGBT) or a bipolar transistor. An arbitrary transistor includes a first electrode, a second electrode and a control electrode. In an FET, one between the first and second electrodes is the drain and the other is the source, and the control electrode is the gate. In an IGBT, one between the first and second electrodes is the collector and the other is the emitter, and the control electrode is the gate. For a bipolar transistor that is not an IGBT, one between the first and second electrodes is the collector and the other is the emitter, and the control electrode is the base.

Various modifications may be made to the embodiments of the present disclosure within the scope of the technical concept of the claims of the application. The embodiments above are only examples of possible embodiments of the disclosure, and the meanings of the terms of the disclosure or the constituting components are not limited to the meanings of the terms used in the embodiments above. The specific numerical values used in the description are only examples, and these numerical values may be modified to various other numerical values.

<<Note>>

A note is attached to the disclosure to show specific configuration examples of the embodiments above.

A control device according to an aspect of the disclosure configured as below (first configuration). The control device is a control device (2) of a multi-phase DC/DC converter (1), the control device (2) generating an output voltage ($V_{OUT}$) from an input voltage ($V_{IN}$) by using an output-stage circuit (10) including a plurality of channels, each of the plurality of channels having a switching transistor (11), a coil (12) and a rectifying element (13). The control device (2) includes: an error signal generation circuit (20), configured to generate an error signal ($V_{ERR}$) between a feedback voltage ($V_{FB}$) and a reference voltage ($V_{REF}$) according to the output voltage; a current detection circuit (30), configured to, for each of the plurality of channels, analog-to-digital (A/D) convert a target current flowing through the switching transistor during an ON period of the switching transistor to derive a detected current value ($I_{CS}$) of the target current; a pulse-width modulation (PWM) modulation circuit (40), configured to, for each of the plurality of channels, generate a PWM signal ($S_{PWM}$) based on the error signal and a current corresponding signal ($V_{CS}$) according to the target current; and a plurality of drive circuits (50[1] to 50[n]), corresponding to the plurality of channels, each drive circuit driving a corresponding switching transistor based on a corresponding PWM signal. Wherein, the PWM modulation circuit derives an average value ($I_{AVE}$) of a plurality of detected current values ($I_{CS}[1]$ to $I_{CS}[n]$) corresponding to the plurality of channels, specifies a channel corresponding to the detected current value having a greatest difference from the average value as a target channel, and generates a PWM signal corresponding to the target channel such that the current value of the target current in the target channel approaches the average value.

In the multi-phase DC/DC converter, in order to achieve current balance, a reference method for processing necessary signals in an analog region is further researched and developed. However, in the reference method, due to various deviation factors, sometimes the current balancing is contrary to the ideal. In the control device of the first configuration, the detected current value of the target current is derived by means of A/D conversion, and a numerical value (the detected current value) obtained is used to control the value of the target current in the target channel to approach the average value. Therefore, influences of the deviation factors are less likely to take effect, and current balance can be ideally achieved.

The control device of the first configuration may be further configured as below (second configuration). The PWM modulation circuit includes a plurality of modulation blocks (60[1] to 60[n]) corresponding to the plurality of channels. Each modulation block includes: a comparator (63), configured to compare a first comparison input signal ($V_{CMP}$) based on the error signal with a second comparison input signal ($V_{SLP}$) based on the corresponding current corresponding signal, and output a signal (RST) indicating a comparison result; and a superposition circuit (62), configured to superimpose an offset signal on the first comparison input signal or the second comparison input signal. Moreover, each modulation block generates a corresponding PWM signal based on the output signal of the comparator. The PWM modulation circuit adjusts the offset signal for the target channel such that the current value of the target current in the target channel approaches the average value.

The control device of the second configuration may be further configured as below (third configuration). The PWM modulation circuit, when a difference ($DIF_{TG}$) between the detected current value and the average value for the target channel is equal to or greater than a threshold value ($TH_{DIF}$), executes a process of offset change, and in the process of offset change, the offset signal for the target channel is changed such that the current value of the target current in the target channel approaches the average value.

Accordingly, good current balance can be achieved.

The control device of the third configuration may be further configured as below (fourth configuration). The PWM modulation circuit changes the offset signal for the target channel by a predetermined amount (ΔV) such that the current value of the target current in the target channel approaches the average value in the process of offset change.

Accordingly, good current balance can be achieved.

The control device of the third or fourth configuration may be further configured as below (fifth configuration). The PWM modulation circuit repeats the process of offset change until a difference between the detected current value and the average value for the target channel becomes less than the threshold value.

Accordingly, good current balance can be achieved.

The control device of any one of the second to fifth configurations may further be configured as below (sixth configuration). The PWM modulation circuit includes: a set signal output circuit (70) configured to output a plurality of set signals (SET[1] to SET[n]) with different phases corresponding to the plurality of channels, and each modulation block includes a logic circuit (64) configured to generate a corresponding PWM signal based on the output signal of the comparator and a corresponding set signal.

The control device of any one of the first to sixth configurations may further be configured as below (seventh configuration). The current detection circuit receives the current corresponding signal as an analog signal for each of the plurality of channels, and A/D converts the analog signal to generate a digital signal having the detected current value.

The control device of any one of the first to seventh configurations may further be configured as below (eighth configuration). For each of the plurality of channels, a current corresponding to the target current is supplied from a connection node between the switching transistor and the coil toward an output terminal, thereby generating the output voltage at the output terminal.

The disclosure may further be configured (ninth configuration) to include: the control device (2) of any one of the first to eighth configurations; and an output-stage circuit (10[1] to 10[n]) for the plurality of channels. Wherein, for each of the plurality of channels, the switching transistor is switched based on the PWM signal, and a current corresponding to the target current is supplied in a direction from a connection node between the switching transistor and the coil toward an output terminal, thereby generating the output voltage at the output terminal.

The invention claimed is:

1. A control device of a multi-phase DC/DC converter that generates an output voltage from an input voltage by using an output-stage circuit including a plurality of channels, each of the plurality of channels has a switching transistor, a coil and a rectifying element, the control device comprising:
   an error signal generation circuit, configured to generate an error signal between a feedback voltage and a reference voltage according to the output voltage;
   a current detection circuit, configured to, for each of the plurality of channels, analog-to-digital (A/D) convert a target current flowing through the switching transistor during an ON period of the switching transistor to derive a detected current value of the target current;
   a pulse-width modulation (PWM) modulation circuit, configured to, for each of the plurality of channels, generate a PWM signal based on the error signal and a current corresponding signal according to the target current; and
   a plurality of drive circuits, corresponding to the plurality of channels, each drive circuit driving a corresponding switching transistor based on a corresponding PWM signal,
   wherein the PWM modulation circuit
      derives an average value of a plurality of detected current values corresponding to the plurality of channels,
      specifies a channel corresponding to the detected current value having a greatest difference from the average value as a target channel, and
      generates the PWM signal corresponding to the target channel such that the current value of the target current in the target channel approaches the average value,
   wherein the PWM modulation circuit includes a plurality of modulation blocks corresponding to the plurality of channels,
   each modulation block including:
      a comparator, configured to
         compare a first comparison input signal based on the error signal with a second comparison input signal based on the corresponding current corresponding signal, and
         output a signal indicating a comparison result; and
      a superposition circuit, configured to superimpose an offset signal on the first comparison input signal or the second comparison input signal,
   each modulation block generating a corresponding PWM signal based on the output signal of the comparator, wherein
   the PWM modulation circuit adjusts the offset signal for the target channel such that the current value of the target current in the target channel approaches the average value.

2. The control device of the multi-phase DC/DC converter of claim 1, wherein
   the PWM modulation circuit, when a difference between the detected current value and the average value for the target channel is equal to or greater than a threshold value, executes a process of offset change, and
   in the process of offset change, the offset signal for the target channel is changed such that the current value of the target current in the target channel approaches the average value.

3. The control device of the multi-phase DC/DC converter of claim 2, wherein
   the PWM modulation circuit changes the offset signal for the target channel by a predetermined amount such that the current value of the target current in the target channel approaches the average value in the process of offset change.

4. The control device of the multi-phase DC/DC converter of claim 3, wherein
   the current detection circuit receives the current corresponding signal as an analog signal for each of the plurality of channels, and A/D converts the analog signal to generate a digital signal having the detected current value.

5. The control device of the multi-phase DC/DC converter of claim 3, wherein
   for each of the plurality of channels, a current corresponding to the target current is supplied from a connection node between the switching transistor and the coil toward an output terminal, thereby generating the output voltage at the output terminal.

6. The control device of the multi-phase DC/DC converter of claim 2, wherein
the PWM modulation circuit repeats the process of offset change until a difference between the detected current value and the average value for the target channel becomes less than the threshold value.

7. The control device of the multi-phase DC/DC converter of claim 6, wherein
the current detection circuit receives the current corresponding signal as an analog signal for each of the plurality of channels, and A/D converts the analog signal to generate a digital signal having the detected current value.

8. The control device of the multi-phase DC/DC converter of claim 6, wherein
for each of the plurality of channels, a current corresponding to the target current is supplied from a connection node between the switching transistor and the coil toward an output terminal, thereby generating the output voltage at the output terminal.

9. The control device of the multi-phase DC/DC converter of claim 2, wherein
the current detection circuit receives the current corresponding signal as an analog signal for each of the plurality of channels, and A/D converts the analog signal to generate a digital signal having the detected current value.

10. The control device of the multi-phase DC/DC converter of claim 2, wherein
for each of the plurality of channels, a current corresponding to the target current is supplied from a connection node between the switching transistor and the coil toward an output terminal, thereby generating the output voltage at the output terminal.

11. The control device of the multi-phase DC/DC converter of claim 1, wherein
the PWM modulation circuit includes a set signal output circuit configured to output a plurality of set signals with different phases corresponding to the plurality of channels, and
each modulation block includes a logic circuit configured to generate a corresponding PWM signal based on the output signal of the comparator and a corresponding set signal.

12. The control device of the multi-phase DC/DC converter of claim 11, wherein
the current detection circuit receives the current corresponding signal as an analog signal for each of the plurality of channels, and A/D converts the analog signal to generate a digital signal having the detected current value.

13. The control device of the multi-phase DC/DC converter of claim 11, wherein
for each of the plurality of channels, a current corresponding to the target current is supplied from a connection node between the switching transistor and the coil toward an output terminal, thereby generating the output voltage at the output terminal.

14. The control device of the multi-phase DC/DC converter of claim 1, wherein
the current detection circuit receives the current corresponding signal as an analog signal for each of the plurality of channels, and A/D converts the analog signal to generate a digital signal having the detected current value.

15. The control device of the multi-phase DC/DC converter of claim 1, wherein
for each of the plurality of channels, a current corresponding to the target current is supplied from a connection node between the switching transistor and the coil toward an output terminal, thereby generating the output voltage at the output terminal.

16. A multi-phase DC/DC converter, comprising:
the control device of the multi-phase DC/DC converter of claim 1; and
an output-stage circuit for the plurality of channels, wherein
for each of the plurality of channels,
the switching transistor is switched based on the PWM signal, and
a current corresponding to the target current is supplied in a direction from a connection node between the switching transistor and the coil toward an output terminal, thereby generating the output voltage at the output terminal.

* * * * *